United States Patent
Kyburz et al.

(10) Patent No.: US 11,880,191 B2
(45) Date of Patent: Jan. 23, 2024

(54) REMOTE ACTIVATION OF THE WIRELESS SERVICE INTERFACE OF A CONTROL DEVICE VIA A BUS SYSTEM

(71) Applicant: Siemens Schweiz AG, Zürich (CH)

(72) Inventors: Beat Kyburz, Ottenbach (CH); Herbert Meier, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

(21) Appl. No.: 17/777,481

(22) PCT Filed: Nov. 18, 2020

(86) PCT No.: PCT/EP2020/082574
§ 371 (c)(1),
(2) Date: May 17, 2022

(87) PCT Pub. No.: WO2021/099412
PCT Pub. Date: May 27, 2021

(65) Prior Publication Data
US 2022/0413473 A1    Dec. 29, 2022

(30) Foreign Application Priority Data

Nov. 19, 2019 (DE) .................. 10 2019 217 769.7

(51) Int. Cl.
*G05B 19/418*    (2006.01)
*H04L 12/40*     (2006.01)
(52) U.S. Cl.
CPC .. *G05B 19/41855* (2013.01); *H04L 12/40169* (2013.01); *H04L 2012/4026* (2013.01)

(58) Field of Classification Search
CPC .............. G05B 19/418; G05B 19/4185; G05B 19/41855; H04L 12/40169; H04L 2012/4026
See application file for complete search history.

(56) References Cited

U.S. PATENT DOCUMENTS

| 11,674,789 B2* | 6/2023 | Styles ................. G01B 21/047 33/504 |
| 2004/0249597 A1* | 12/2004 | Whitehead ............... F24F 11/30 702/118 |

(Continued)

FOREIGN PATENT DOCUMENTS

| DE | 10 2013 220 865 | 4/2015 | ............. H04M 1/21 |
| DE | 10 2014117 894  | 6/2016 | ............. H04L 12/24 |

(Continued)

OTHER PUBLICATIONS

Search Report for International Application No. PCT/EP2020/082574, 12 pages, dated Mar. 5, 2021.

(Continued)

*Primary Examiner* — Jenee Holland
(74) *Attorney, Agent, or Firm* — Slayden Grubert Beard PLLC (57) ABSTRACT

Various embodiments of the teachings herein include a control device for controlling one or more field devices connected to the control device by data technology in the form of a communication network. The control device includes a wireless service interface. The communication network connects the control device to one or more tools. The wireless service interface can be activated by first tool via the communication network.

18 Claims, 2 Drawing Sheets

(56) References Cited

U.S. PATENT DOCUMENTS

| | | | |
|---|---|---|---|
| 2006/0277289 A1* | 12/2006 | Bayliss | G05B 19/418 709/223 |
| 2008/0058993 A1* | 3/2008 | Tain | G05B 19/41845 700/275 |
| 2008/0082579 A1* | 4/2008 | Huang | G05B 19/418 |
| 2011/0004685 A1* | 1/2011 | De Groot | G06F 21/6218 709/225 |
| 2011/0161844 A1* | 6/2011 | Brindle | G06Q 10/06 711/E12.008 |
| 2012/0246376 A1* | 9/2012 | Kolblin | H04L 41/34 710/305 |
| 2012/0306648 A1* | 12/2012 | Karaffa | G05B 19/409 340/540 |
| 2014/0067150 A1* | 3/2014 | Songkakul | G06Q 10/06312 700/297 |
| 2014/0352408 A1* | 12/2014 | Tharaldson | G05B 23/0256 73/46 |
| 2016/0004240 A1* | 1/2016 | Willgert | B60L 3/12 700/275 |
| 2016/0041743 A1* | 2/2016 | Kilian | G06F 3/04842 715/747 |
| 2016/0161934 A1 | 6/2016 | Haase | |
| 2016/0231724 A1 | 8/2016 | Bauer | |
| 2017/0111212 A1* | 4/2017 | Alam | H04L 41/0659 |
| 2017/0302756 A1* | 10/2017 | Chou | H04L 67/565 |
| 2018/0024538 A1* | 1/2018 | Benson | G08B 21/185 340/539.11 |
| 2018/0026677 A1* | 1/2018 | Benson | H04B 3/548 455/127.1 |
| 2018/0026809 A1* | 1/2018 | Benson | H04B 3/548 370/311 |
| 2018/0026840 A1* | 1/2018 | Toepke | H04L 41/12 709/222 |
| 2018/0027071 A1* | 1/2018 | Toepke | H04L 67/1095 709/217 |
| 2018/0179022 A1* | 6/2018 | Huber | B66B 5/024 |
| 2019/0146431 A1* | 5/2019 | Nayak | G05B 15/02 700/276 |
| 2019/0205325 A1* | 7/2019 | Dobrynin | G06F 16/3344 |
| 2019/0219293 A1* | 7/2019 | Wenzel | G06Q 50/06 |
| 2019/0258596 A1* | 8/2019 | Sotriffer | G05B 19/056 |
| 2019/0320515 A1* | 10/2019 | Sadwick | H05B 45/00 |
| 2019/0376777 A1* | 12/2019 | Styles | G05B 19/401 |
| 2021/0240643 A1* | 8/2021 | Ramm | G06F 9/44505 |
| 2022/0404814 A1* | 12/2022 | Kyburz | H04L 12/40169 |

FOREIGN PATENT DOCUMENTS

| | | | |
|---|---|---|---|
| EP | 3 432 276 | 1/2019 | G07C 9/00 |
| EP | 3 518 610 | 7/2019 | H04W 76/10 |

OTHER PUBLICATIONS

AVM GmbH; "FRITZ!Box 7490 Einrichten und Bedienen. Auszug relevanter Seiten"; Berlin: AVM GmbH; Jun. 12, 2019; pp. 19-21, 55, 67-68, 175-177, 180, 285-286; https://web.archive.org/web/20190829064223/https://assets.avm.de/files/docs/fritzbox/fritzbox-7490/fritzbox-7490_man_de_DE.pdf [abgerufen am Nov. 14, 2020]; [Online-Veröffentlichung über Archive.arg am Aug. 29, 2019].
Screenshot der Webseite web.archive.org mit Link zur Veröffentlichung der Datei fritzbox-7490_man_de_DE.pdf; Aug. 29, 2019 [abgerufen am Nov. 14, 2019].

\* cited by examiner

FIG 1 wherein a wireless service interface (for example WiFi interface) of the control device is activated via a signal generated by a first tool and sent to the control device. — VS1

FIG 2

FIG 3 wherein a wireless service interface (for example WiFi interface) of the control device is activated via a signal generated by a third tool and sent to the control device. — VS1'

FIG 4

REMOTE ACTIVATION OF THE WIRELESS SERVICE INTERFACE OF A CONTROL DEVICE VIA A BUS SYSTEM

CROSS-REFERENCE TO RELATED APPLICATIONS

This application is a U.S. National Stage Application of International Application No. PCT/EP2020/082574 filed Nov. 18, 2020, which designates the United States of America, and claims priority to DE Application No. 10 2019 217 769.7 filed Nov. 19, 2019, the contents of which are hereby incorporated by reference in their entirety.

TECHNICAL FIELD

The ore sent disclosure relates to building automation. Various embodiments of the teachings herein may include control devices for controlling one or more field devices and/or methods for transmitting data to a control device.

BACKGROUND

The commissioning of building automation systems for heating, ventilation, air conditioning (HVAC), etc. requires the efficient uploading of larger volumes of data (for example application software, parameterization data, text libraries, UI graphics for the user interface) to the control devices (for example controllers, automation devices) required for this purpose. In addition, firmware updates (for bug fixes, security updates or functional expansions) are frequently required during commissioning or maintenance of the control devices. At the time of commissioning of control devices (for example IP-based controllers) for building automation that communicate an Internet Protocol (for example IPv4, IPv6), the IP building network (backbone) is frequently not yet operational and hence efficient uploading of larger volumes of data via the backbone is not possible.

The low transmission capacity means uploading of larger volumes of data to control devices with a "non IP building network" (for example BAGnet MSTP backbone) is generally very inefficient and take far too long for commissioning (for example, several hours for a firmware update). In principle, larger volumes of data could be efficiently uploaded to the controller via a local USB interface on the controller (control device). However, controllers for automation systems axe frequently installed at locations that are difficult to access (for example in false ceilings, in window panels or in false floors) and attaching a USB cable between the tool and controller laborious and time-consuming. In addition, the length of USB cables is limited to a few meters.

SUMMARY

The teachings of the present disclosure include control devices to which larger volumes of data can be efficiently uploaded and/or methods for efficiently uploading larger volumes of data to control devices, in particular for building automation. For example, some embodiments include a control device (SG), in particular for building automation, for controlling one or more field devices (FG1-FG3), which are connected to the control device (SG) by data technology in the form of a communication network (KN1), in particular a field bus, wherein the control device (SG) is furthermore connected to one or more tools (T1) by the communication network (KN1), wherein the control device (SG) comprises a wireless service interface (SS), characterized in that the control device (SG) is configured such that the wireless service interface (SS) can be activated by a first tool (T1) via the communication network (KN1).

In some embodiments, the control device (SG) is configured such that the wireless service interface (SS) can be activated by a received broadcast trigger command (SIG1) of the first tool (T1).

In some embodiments, the control device (SG) is configured such that the wireless service interface (SS) can be activated by specific commands (SIG1) of the communication network (KN1) triggered by the first tool (T1).

In some embodiments, the control device (SG) is configured such that activation of the wireless service interface (SS) takes place by simulating an actuation of a service button (ST) located locally on the control device (SG).

In some embodiments, the control device (SG) is configured to receive data (FW) and/or send data via the wireless service interface (SS) after activation of the wireless service interface (SS).

In some embodiments, the control device (SG) s configured to receive the data (FW) from the first tool (T1) or from a second tool (T2) via the Wireless service interface (SS).

In some embodiments, the control device (SG) is configured such that the wireless service interface (SS) can be deactivated by the first tool (T1) via the communication network (KN1).

As another example, some embodiments include a method for transmitting data to a control device (SG), in particular for building automation, wherein the control device (SG) is furthermore connected to one or more tools (T1) by a communication network (KN1), (VS1) wherein a wireless service interface (SS) of the control device (SG) is activated via a signal (SIG1) generated by a first tool (T1) and sent to the control device (SG).

In some embodiments, after activation of the wireless service interface (SS), data is transferred from the first tool (T1) or from a second tool (T2) to the control device (SG) via the wireless service interface (SS) and/or data is read from the control device (SG).

In some embodiments, the activation of the wireless service interface (SS) takes place by simulating the actuation of a service button (ST) located locally on the control device (SG).

In some embodiments, the wireless service interface (SS) is automatically deactivated when the data transfer has been completed (FW).

In some embodiments, the wireless service interface (SS) of the control device (SG) is deactivated via a further signal (SIG1') generated by a first tool (T1) and sent to the control device (SG)

As another example, some embodiments include a control device (SG1), in particular for building automation, for controlling one or more field devices (FG1-FG3), wherein the control device (SG1) is connected to one or more tools (T3) by a backbone network (KN2), in particular a non-IP network, wherein the control device (SG1) comprises a wireless service interface (SS), characterized in that the control device (SG1) is configured such that the wireless service interface (SS) can be activated by a third tool (T3) via the backbone network (KN2).

In some embodiments, the control device (SG1) is configured such that the wireless service interface (SS) can be activated by specific commands (SIG2) of the backbone network (KN2) triggered by the third tool (T3).

In some embodiments, the control device (SG1) is configured such that activation of the wireless service interface (SS) takes place by simulating an actuation of a service button (ST) located locally on the control device (SG1). In some embodiments, after activation of the wireless service interface (SS) the control device (SG1) is configured to receive or send data (FW) via the wireless service interface (GS1).

In some embodiments, the control device (SG) is configured such that the wireless service interface (SS) can be deactivated by the third tool (T3) via the communication network (RN1).

As another example, some embodiments include a method for transmitting data (FW) to a control device (SG1), in particular for building automation, wherein the control device (SG) is Connected to one or more tools (T3) by a backbone network (KN2), in particular a non-IP network, (VS1') wherein a wireless service interface (SS) of the control device (SG1) is activated via a signal (SIG2) generated by a third tool (T3) and sent to the control device (SG1).

In some embodiments, after activation of the wireless service interface (SS) data (FW) is transferred from the third tool (T3) or from a fourth tool (T4) to the control device (SG1) via the wireless service interface (SS) and/or data is read from the control device (SG1).

In some embodiments, the third tool (T3) selects a control device (SG1) available on the backbone network (KN2) as the recipient of the data (FW).

In some embodiments, the wireless service interface (SS) of the control device (SG1) is deactivated via a further signal (SIG2') generated by the third tool (T3) and sent to the control device (SG1).

BRIEF DESCRIPTION OF THE DRAWINGS

The teachings herein and advantageous embodiments of the present disclosure are explained using the example of the following figure, which shows.

DETAILED DESCRIPTION

Various embodiments of the teachings herein include a control device (for example controller, automation device), in particular for building automation, for controlling one or more field devices, which are connected to the control device by data technology in the form of a communication data network, in particular a field bus, wherein the control device is furthermore connected by the communication network to one or more tools (for example engineering tool; PC), wherein the control device comprises a wireless service interface (for example WiFi interface), wherein the control device is configured such that the wireless service interface can be activated (or switched on) by a first tool (for example engineering system, commissioning tool, PC) via the communication network. In building automation, field device (for example actuator or sensor) is assigned to exactly one control device (for example controller). Hence, generally only one single) control device (for example controller) is attached to the field bus. If a tool is attached to the field bus (for example building installation bus, KNX bus), the connection between the tool and the control device (controller) via the field bus is unique. This ensures that a signal generated by a tool attached to the field bus (for example specific field bus command or a broadcast trigger command) is received by the associated control device (i.e. by the controller that actuates the field devices attached to the field bus).

This simple and unique remote activation of the local wireless service interface enables, for example, a service technician or facility manager to identify (locate) the correct controller for the room very quickly, efficiently and reliably and directly start the fast download of the required data to the corresponding controller. The building backbone (i.e. the backbone network in the building, for example an IP network) does not have to be operational for this. There no need for time-consuming localization of the controller in poorly accessible locations and the removal of false ceilings, window panels or false floors in order to attach a USB cable to the controller or to actuate the service button on the controller (control device). On-the-fly servicing is greatly simplified and expedited because data can be uploaded to the controller (control device) at high speed via the wireless service interface. Commissioning of the controller and servicing (for example maintenance, patching, firmware update) can performed much more Quickly and reliably. The control device is optionally configured such that the wireless service interface can be activated (or switched on) and/or can be deactivated by a first tool (for example engineering system, commissioning tool, PC) via the communication network.

In some embodiments, the control device is configured such that the wireless service interface can be activated by a received broadcast trigger command from the first tool. Since, the field bus topology includes exactly one control device (controller), it is ensured that the broadcast trigger command reaches the control device without further addressing. The control device is configured to activate the wireless service interface of the control device on reception of the broadcast trigger command.

In some embodiments, the control device is configured such that the wireless service interface can be activated by specific commands of the communication network triggered by the first tool. If the communication network is a field bus, a tool attached to the field bus (for example an engineering tool) can send field-bus specific commands to the control device via the field bus. In the case of a KNX bus, for example, commands in the KNX communication protocol. The control device is configured to receive and process such commands, for example in order to activate the wireless service interface of the control device. A tool (for example engineering tool) can be directly at to the field. bus, for example via a suitable attaching mechanism (for example bus coupler). However, a tool can also be attached to the field bus via an interface of a field device attached to the field bus. For example, via a tool connector (for example USB interface) of the field device.

In some embodiments, the control device is configured such that activation of the wireless service interface takes place by simulating the actuation of a service button located locally on the control device. When the control device receives a corresponding signal from a tool (for example broadcast trigger command, field-bus specific command), the logic held in the control device (advantageously by corresponding software) simulates the actuation of a service button located locally on the control device and thereby activates the wireless service interface of the control device (controller). The controller, i.e. the control device, implements this received signal by simulating the actuation of the local service button on the control device as if someone had actuated the service button locally on the controller.

In some embodiments, the control device is configured to receive data and/or send data via the wireless service interface (for example radio interface, WLAN, WiFi) after activation of the wireless service interface. On-the-fly commissioning and servicing is greatly simplified and expedited because data can be uploaded to the control device at high speed via the wireless service interface.

In some embodiments, the control device is configured to receive the data (for example firmware, firmware update) from the first tool or from a second tool via the wireless service interface. The first tool or the second tool can, for example, be mobile communication terminals, smartphones, tablet computers or personal computers (PCs) equipped, for example, with corresponding software for an engineering tool and/or commissioning tool and/or configuration tool. The first tool and second tool can be different tools operated, for example, by different users. However, the first and second tool can also be identical.

In some embodiments, the control device configured to automatically deactivate the wireless service interface after receiving or sending the data. Automatically switching off the wireless service interface by means of a timeout eliminates the need for manual deactivation by the service technician (which is often forgotten) when the servicing is completed.

In some embodiments, in the event of non-use, the wireless service interface is automatically deactivated after a defined time period. Automatically switching off the wireless service interface by means of a timeout eliminates the need for manual deactivation by the service technician (which is often forgotten) when the servicing is completed.

In some embodiments, the control device is configured such that the wireless service interface can be deactivated by the first tool via the communication network (KN1). This can conveniently take place by means of a corresponding operator input.

In some embodiments, there is a method for transmitting data to a control device (for example controller, automation device), in Particular for building automation, wherein the control device is furthermore connected to one or more tools (for example engineering tool; PC) by the communication network, wherein a wireless service interface (for example WiFi interface) of the control device is activated via a signal generated by a first tool and sent to the control device. The control device may be configured to control one or more field devices, which are connected to the control device (controller) by data technology in the form of a communication network, in particular a field bus. The method is easy to implement with infrastructure that is already available. The communication network may be a field bus (for example installation bus, KNX bus).

In some embodiments, after activation of the wireless service interface, data is transferred from the first tool (engineering tool, commissioning tool) or from a second tool to the control device via the wireless service interface or data is read from the control device. The first tool or the second tool can, for example, be mobile communication terminals, smartphones, tablet computers or personal computers (PCs) equipped, for example, with corresponding software for an engineering tool and/or commissioning tool and/or configuration tool. The first tool and second tool can be different tools operated, for example, by different users. However, the first and second tool can also be identical. The fact that the data is transferred to the control device via the wireless service interface (for example WLAN, WiFi) enables large volumes of data, such as those required for a firmware upload or large application programs, for example, to be transferred very (quickly and efficiently to the control device.

In some embodiments, the activation of wireless service interface takes place by simulating an actuation of a service button located locally on the control device. The control device (for example controller, PLC) is configured to implement this received signal such that the actuation of the local service button is simulated on the controller (control device) as if someone had actuated the service button locally on the controller.

In some embodiments, the wireless service interface is automatically deactivated when the data transfer has been completed. Automatically switching off the wireless service interface by means of a timeout eliminates the need for manual deactivation by the service technician when the servicing is completed.

In some embodiments, the wireless service interface of the control device is deactivated via a signal generated by the first tool and sent to the control device. This can conveniently take place by means of a corresponding operator input.

In some embodiments, an arrangement comprises a control device (controller) incorporating teachings of the present disclosure, correspondingly configured components (tools, etc.) and correspondingly suitable communication links (for example WLAN, field bus).

In some embodiments, a control device (controller), in particular for building automation, for controlling one or more field devices, is connected to one or more tools (for example engineering tool; PC) by a backbone network, in particular a non-IP network, wherein the control device comprises a wireless service interface (for example WiFi interface), wherein the control device is configured such that the wireless service interface can be activated by a third tool (for example engineering tool, engineering system, commissioning tool) via the backbone network. There is no need for time-consuming localization of the control device (for example controller, automation device) in poorly accessible locations and the removal of false ceilings, window panels or false floors in order to attach a USB cable to the controller or to actuate the service button on the controller (control device). On-the-fly servicing is greatly simplified and expedited because data can be uploaded to the controller (control device) at high speed via the wireless service interface. Commissioning of the controller and servicing (for example maintenance, patching, firmware update) become significantly faster and more reliable. A plurality of control devices (controllers) can be attached to the backbone network. A user (for example service technician) makes a corresponding entry or selection on the third tool to select the control device for which the wireless service interface (for example WiFi interface) is to be activated from the control devices (controllers) available on the backbone network. The control device is optionally configured such that the wireless service interface can be activated and/or deactivated via the backbone network by a third tool (for example engineering tool, engineering system, commissioning tool).

In some embodiments, the control device is configured such that the wireless service interface can be activated by specific commands of the backbone network triggered by the third tool. The backbone network can, for example, be a BACnet network (Building Automation and Control Networks). The BACnet network protocol comprises defined instructions and commands. This command set can use specific commands to activate the wireless service interface of the control device. Control devices in a BACnet understand the BACnet-specific commands or can be configured to interpret BACnet-specific commands correspondingly in order to activate the wireless service interface. A BACnet-specific command for activation of the wireless service interface can be sent with high priority.

In some embodiments, the control device is configured such that activation of wireless service interface takes place by simulating an actuation of a service button located locally on the control device. The control device (for example controller, PMC) is configured to implement this received signal so that the actuation of the local service button on the controller (control device) is simulated as if someone had actuated the service button locally on the controller.

In some embodiments, the control device is configured to receive and/or send data via the wireless service interface after activation of the wireless service interface. On-the-fly commissioning and servicing is greatly simplified and expedited because the data can be uploaded to the control at high speed via the wireless service interface.

In some embodiments, the control device is configured such that the wireless service interface can be deactivated by the third tool via the communication network. This can conveniently take place by means of a corresponding operator input.

In some embodiments, there is a method for transmitting data to a control device (for example controller, automation device), in particular for building automation, wherein the control device is connected to one or more tools (for example engineering tool, engineering system, commissioning tool; PC) by a backbone network, in particular a non-IP network, wherein a wireless service interface (for example WiFi interface) of the control device is activated via a signal generated by a third tool and sent to the control device. There is no need for time-consuming localization of the control device (for example controller, automation device) in poorly accessible locations or the removal of false ceilings, window panels or false floors in order to attach a USB cable to the controller or to actuate the service button on the controller (control device). On-the-fly servicing is greatly simplified and expedited because data can be uploaded to the controller (control device) at high speed via the wireless service interface. Commissioning of the controller and servicing (for example maintenance, patching, firmware update) can be performed much more quickly and reliably. A plurality of control devices (controllers) can be attached to the backbone network. A user (for example service technician) makes a corresponding entry or selection on the third tool to select the control device for which the wireless service interface (for example WiFi interface) is to be activated from the control devices (controllers) available on the backbone network. The method can be implemented using infrastructure that is usually already available in a building automation system.

In some embodiments, data is transferred from the third tool (engineering tool commissioning tool) or from a fourth tool to the control device via the wireless service interface and/or data is read from the control device after activation of the wireless service interface. The tool which the wireless service interface is activated on the corresponding control device and the tool which transfers the data (for example firmware) to the corresponding control device via the wireless service interface can be identical. However, they can also be physically different tools or devices.

In some embodiments, the third tool selects a control device (controller) available on the backbone network as the recipient of the data. Hence, the third tool controls the control device of the backbone network for which the wireless interface is to be activated. A user selects the corresponding control device on a list shown on display of the tool.

In some embodiments, the wireless service interface is automatically deactivated when the data transfer has been completed. Automatically switching off the wireless service interface by means of a timeout eliminates the need for manual deactivation by the service technician (which is often forgotten) when the servicing is completed.

In some embodiments, in the event of non-use, the wireless service interface is automatically deactivated after a defined time period. Automatically switching off the wireless service interface by means of a timeout eliminates the need for manual deactivation by the service technician (which is often forgotten) when the servicing is completed.

In some embodiments, the wireless service interface of the control device is deactivated via a signal generated by the third tool and sent to the control device.

In some embodiments, there is an arrangement configured to perform at least one of the methods described herein. The arrangement comprises the control device (controller) incorporating teachings of the present disclosure, correspondingly configured components (tools, etc.) and correspondingly suitable communication links (for example WLAN, field bus).

Figure 1:
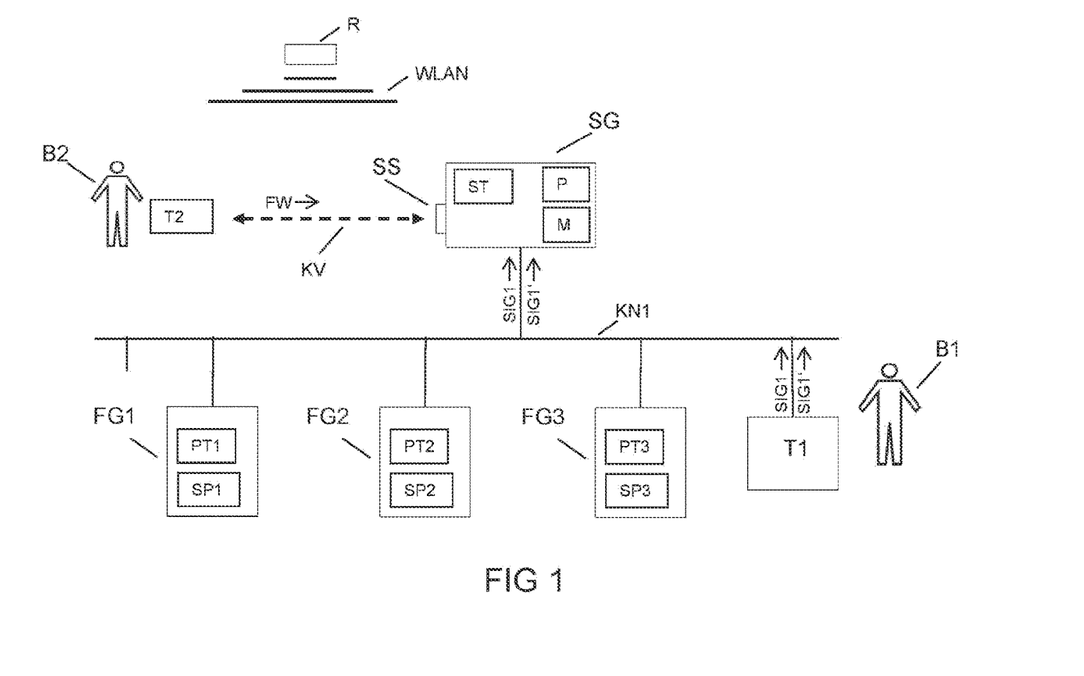
FIG. 1 a first exemplary communication network with an exemplary control device and field devices incorporating teachings of the present disclosure.

FIG. 1 shows a first exemplary communication network KN1 with an exemplary control device SG and field devices FG1-FG3. The exemplary control device SG can, for example, be a correspondingly configured controller or an automation device for building automation, for example for controlling or regulating HVAC functionality (heating, ventilation, air conditioning) in a building. The communication network KN1 may be a field bus or an installation bus (for example KNX bus system). The field devices FG1-FG3 are, for example, actuators (for example drives for awnings or blinds, dimmers, temperature indicators, alarms, etc.) or sensors (for example temperature sensors, temperature detectors, motion detectors, presence detectors, dimmer switches, etc.).

The exemplary control device SG according to FIG. 1 is configured to control one or more field devices FG1-FG3, wherein the field devices FG1-FG3 are connected to the control device SG by data technology in the form of the communication network KN1 (for example field bus or installation bus). The field devices FG1-FG3 may each comprise a corresponding programming button PT1-PT3 and/or a corresponding service pin SP1-SP3. On actuation of the service pin SP1-SP3 or on actuation of the respective programming button PT1-PT3, the respective field device FG1-FG3 generates a message or a signal which is sent to the control device SG (controller).

The control device SG comprises a wireless service interface SS (for example radio interface, WiFi interface), wherein the control device SG is configured to receive a signal SIG1 generated by a tool T1 and to activate the wireless service interface SS based on the signal SIG1. The signal SIG1 can, for example, be triggered and sent by an input from a service technician B1 at the tool 1.

In building automation, a field device FG1-FG3 (for example actuator or sensor) is assigned to exactly one control device SG (for example controller). Hence, generally only one single) control device SG is attached to the field bus KN1. If a tool TI is attached to the field bus (for example building installation bus, KNX bus), the connection between the tool 1 and the control device SG (controller) via the field bus KN1 is unique. This ensures that a signal generated by a tool T1 attached to the field bus KN1 (for example a specific field bus command or a broadcast trigger command) is received by the associated control device SC (i.e. the controller that actuates the field devices attached to the field bus). This simple and unique remote activation of the local wireless service interface SS enables, for example, a service technician or facility manager to identify (locate) the correct controller for the room very quickly, efficiently and reliably and directly start the fast download of the required data to the corresponding controller SG.

Tool T1 is, for example, a suitably configured engineering tool (for example engineering system) or a suitably configured commissioning tool or configuration tool or parameterization tool. Tool T1 can be attached directly to the communication network KN1 by suitable mechanisms and interfaces (for example bus couplers). However, it is also possible for tool T1 to be attached to one of the field devices FG1-FG3 on the communication network KN1 via a corresponding service interface (for example USB interface).

The signal SIG1 is sent to the control device SG via the communication network KN1 (for example building installation bus). The control device SG is configured to receive the signal SIG1 and to evaluate it correspondingly. The control device SG comprises a processor P for executing instructions programs (in particular software (for example applications) or firmware FW). Furthermore, the control device SG comprises one or more storage media M (for example main memory or flash memory) for accenting application software, firmware FW or an operating system.

Nowadays, controllers or control devices SG are increasingly equipped with a local wireless service interface SS (for example WiFi, Bluetooth). The wireless service interface SS has to be manually activated by the technician for service purposes and switches off again automatically after a timeout so that the wireless service interface SS is permanently deactivated in normal operation (for example due to requirements of the building IT administration; as an IT security measure; or due to lower power consumption as the result of a switched off radio module in the controller SG in normal operation).

To date, the wireless service interface SS has been activated via a local service button ST on the control device SG (controller). Poorly accessible installation sites for the control device SG in turn make the actuation of this service button ST to activate the wireless service interface SS by an operator B1, B2 laborious and time-consuming (for example dismantling panels, opening covers). Therefore, the control device SG is advantageously configured to simulate the actuation of a service button ST located locally on the control device SG by the received signal SIG1 and thereby activate the wireless service interface SS. The wireless service interface SS is, for example, a radio interface (for example WiFi interface). After activation of the wireless service interface SS, the control device SG is configured to receive data (for example firmware FW and/or application programs) and/or to send data via the wireless service interface SS. In the depiction according to FIG. 1, after activation of the wireless service interface SS, the control device SG is located in the WLAN network of an exemplary router R. After activation of the wireless service interface SS, a user B2 (for example commissioning engineer or service technician) can upload firmware FW or a firmware update to the control device SG via a tool T2 (for example mobile communication terminal, smartphone, tablet computer, PC). The WLAN network of the router R establishes the communication link KV between tool T2 (for example engineering tool or commissioning tool) and the control device SG.

In some embodiments, the control device SG is configured automatically to deactivate the wireless service interface SS after the reception or transmission of the data FW. Data can, for example, be user data, parameters, configurations, application software, and/or firmware FW.

In some embodiments, the control device SG is configured to receive data (for example firmware, firmware update)) from the first tool T1 or from a second tool T2 via the wireless service interface SS. The first tool T1 or second tool T2 can, for example, be mobile communication terminals, smartphones, tablet computers, personal computers (PCs) equipped, for example, with corresponding software for an engineering tool and/or commissioning tool and/or configuration tool. The first tool T1 and second tool can be physically different tools operated for example by different users B1 or B2, However, the first and second tool T1, T2 can also be identical.

In some embodiments, in the event of non-use, the wireless service interface SS is automatically deactivated after a defined time period. In some embodiments, the wireless service interface SS of the control device SG can be deactivated via a signal SIG1' generated by the first tool T1 and sent to the control device SG.

Figure 2:
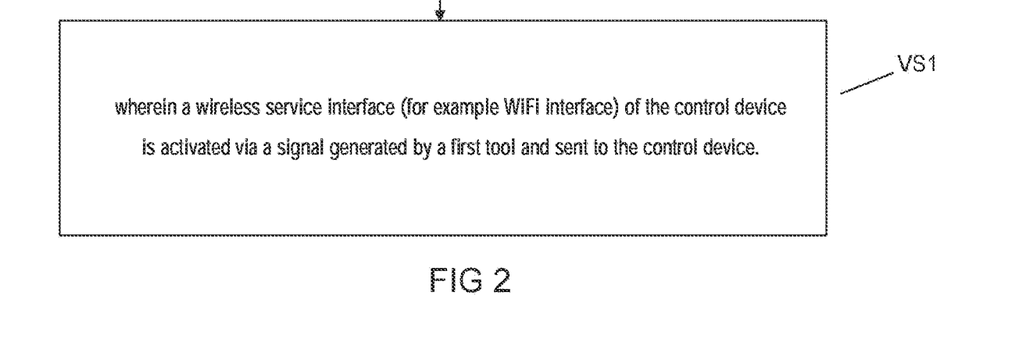
FIG. 2 a first exemplary flowchart for a method for transmitting data to a control device incorporating teachings of the present disclosure.

Exemplary scenario for using e arrangement according to FIG. 1:
1. User B1 activates a service on tool T1
2. The signal SIG1 is sent to the control device for example controller) SG via the communication network KN1
3. Control device SG activates WLAN (wireless service interface, for example WiFi interface)
4. User B2 connects tool T2 via communication link KV (for example suitable radio link)
5. User B2 works with control device SG via KV/SS
6. User B2 terminates connection from tool T2 to control device SG
7. Optional: user B1 deactivates WLAN from control device SG
8. Optional: control device SG checks WLAN status after timeout: if WLAN active, deactivate WLAN FIG. 2 shows a first exemplary flowchart for a method for transmitting data to a control device (controller), in particular for building automation, wherein the control device is furthermore connected to one or more tools (for example engineering tool; PC) by a communication network, (VS1) wherein wireless service interface (for example WiFi interface) of the control device is activated via a signal generated by a first tool and sent to the control device. In some embodiments, after activation of the wireless service interface, data transferred to the control device from the first tool (engineering tool, commissioning tool) or from a second tool via the wireless service interface or data is read from the control device. In some embodiments, the wireless service interface is activated by simulating an actuation of service button located locally on the control device.

In some embodiments, when the data transfer has been completed, the wireless service interface is automatically deactivated. In some embodiments, in the event of non-use, the wireless service interface is automatically deactivated after a defined time period.

Exemplary Scenario for the Use of the Method According to the Exemplary Flowchart According to FIG. 2:

The wireless service interface is activated by a tool_A (for example PC) via an available slow field bus system, such as, for example, KNX, Modbus. Generally, only one controller is attached to the field bus. Therefore, the connection between tool_A and the controller via the field bus is unique.
  i. On certain field devices (for example KNX PL-Link room units), a tool_A can be attached directly to the field bus in a simple manner by tool connector
  ii. For example, tool_A sends broadcast trigger command for remote activation of the service button via the field bus. The controller implements this signal by simulating the actuation of the local service button on the controller as if someone had actuated the service button locally on the controller,
  iii. Or the explicit manual switching on and off of the local wireless service interface can take place by corresponding tool commands from tool_A via specific field bus commands.
  iv. The selected controller can be easily identified on a tool_B by detecting the wireless network (for example a new WiFi SSID) and connected to tool_B.
  v. Optionally, tool_A can be reconnected to the controller via the activated wireless service interface.

Advantages of the Method According to the Exemplary Flowchart According to FIG. 2 are in Particular:

After the connection of tool_B to the wireless service interface, larger volumes of data can be uploaded to the controller very easily and quickly.

The activated wireless service interface advantageously automatically switches off if it is not used (after a timeout).

After controller reboot, the wireless service interface is advantageously no longer switched on (for example reboot after successful FW download).

Tool_A is used to activate the wireless service interface via a bus system.

Tool_B is used to upload data to the controller via the wireless service interface.

Tool_A and tool_B can be identical; they can be operated by different or identical users.

The method can be implemented with infrastructure that is usually already present in a building (for example WLPN routers). In some embodiments, there is an arrangement configured to perform one or more of the methods described herein.

Exemplary further advantages of the present invention (according to the exemplary embodiment according to FIG. 1 or FIG. 2):

The simple and unique remote activation of the local wireless service interface enables the service technician to identify (locate) the correct controller for the room very quickly, efficiently and reliably and directly start the fast download of the required data. The building backbone does not have to be operational for this.

There is no need for time-consuming localization of the controller in poorly accessible locations and the removal of false ceilings, window panels or false floors in order to attach a USB tool cable or to actuate the service button.

On-the-fly servicing is greatly simplified and expedited because data can be uploaded at high speed via the wireless service interface.

Automatically switching off the wireless service interface by means of a timeout eliminates the need for manual deactivation by the service technician (which is often forgotten) when the servicing is completed Commissioning and servicing are performed much more quickly and reliably.

Figure 3:
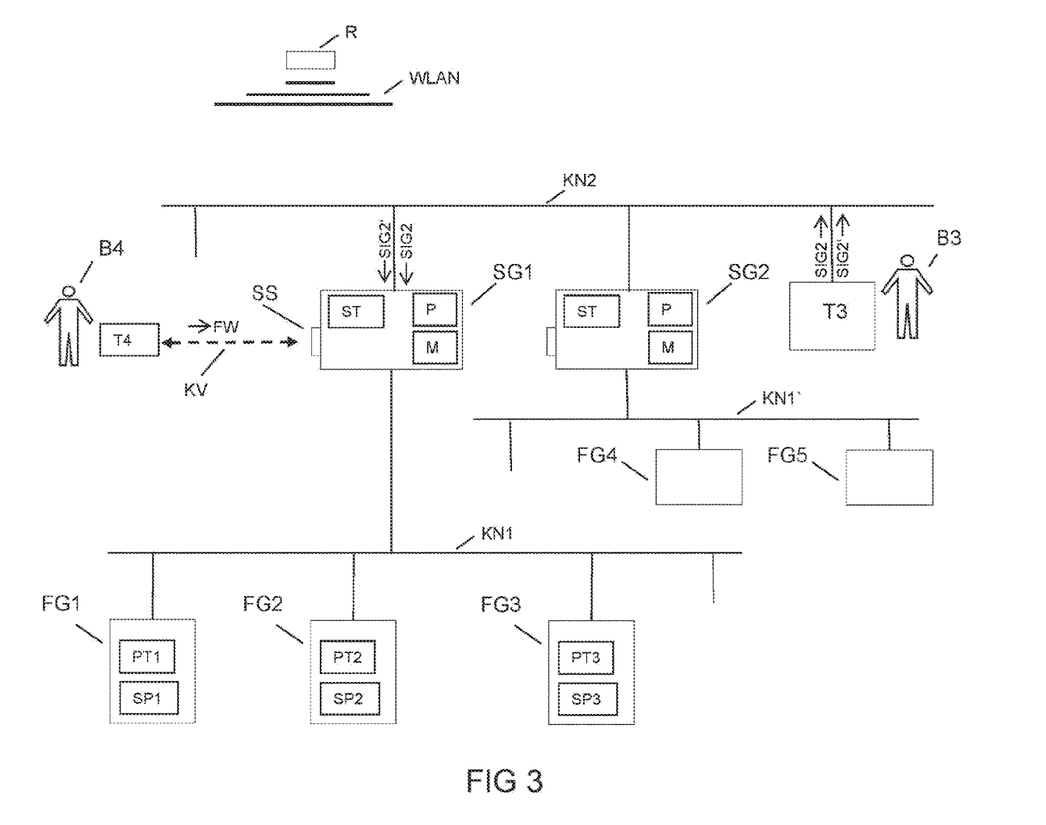
FIG. 3 a second exemplary communication network with exemplary control devices incorporating teachings of the present disclosure.

FIG. 3 shows a second exemplary communication network KN2 with exemplary control devices SG1, SG2 incorporating teachings of the present disclosure. The exemplary communication network KN2 is a backbone network, in particular a non-IP network, for example a BACnet network, (i.e. a network according to the BACnet protocol, Building Automation and Control Networks. BACnet is a network protocol for building automation. The exemplary control devices SG1, SG2 are, for example, controllers, automation devices or programmable logic control (PLC). The exemplary control devices SG1, SG2 are connected to corresponding field devices FG1-FG5 (for example actors or sensors) via suitable communication networks KN1 or KN1' (for example field bus connections, installation bus connections, or KNX bus) for controlling HVAC equipment (heating, ventilation, air conditioning) in a building.

The exemplary control device SG1 for controlling one or more field devices FG1-FG3 is connected to one or more tools T3 (for example engineering tool; PC) by a backbone network KN2 (for example BACnet network), in particular a non-IP network. The control device SG1 comprises a wireless service interface SS (for example WiFi interface), wherein the control device SG1 is configured such that the wireless service interface SS can be activated by a third tool T3 via the backbone network KN2.

The exemplary control device SG1 can, for example, be a correspondingly configured controller or an automation device for building automation, for example for controlling or regulating HVAC functionality (heating, ventilation, air conditioning) in a building. The communication network KN1 may be a field bus or an installation bus (for example KNX bus system). The field devices FG1-FG3 are, for example, actuators (for example drives for awnings or blinds, dimmers, temperature displays, alarms, etc.) or sensors (for example temperature sensors, temperature detectors, motion detectors, presence detectors, dimmer switches, etc.).

The exemplary control device SG1 according to FIG. 3 is configured to control one or more field devices FG1-FG3, wherein the field devices FG1-FG3 are connected to the control device SG by data technology in the form of the communication network KN1 (for example field bus or installation bus). The field devices FG1-FG3 advantageously each comprise a corresponding programming button PT1-PT3 and/or a corresponding service pin SP1-SP3.

In some embodiments, the control device SG1 comprises a wireless service interface SS (for example radio interface, WiFi interface), wherein the control device SG1 is configured to receive a signal SIG2 generated by a tool T3 and to activate the wireless service interface SS based on the signal SIG2. The signal SIG2 can, for example, be triggered and sent by an input from a service technician B3 at the tool 3. This simple and unique remote activation of the local wireless service interface SS enables, for example, a service technician or facility manager to identify (locate) the correct controller SG1 for the room quickly, efficiently and reliably and directly start the fast download of the required data to the corresponding controller SG1.

Tool T3 is, for example, a suitably configured engineering tool (for example engineering system) or a suitably configured commissioning tool or configuration tool or parameterization tool. Tool T3 can be attached directly to the communication network KN2 by suitable mechanisms and interfaces (for example bus couplers). However, it is also possible for tool T3 to be attached to one of the control devices SG2 on the communication network KN2 via a corresponding service interface (for example USB interface).

The signal SIG2 is sent to the control device SG1 via the communication network KN2 (for example BACnet network). The control device SG1 is configured to receive the signal SIG2 and evaluate it correspondingly. The control device SG1 comprises a processor P for executing instructions programs (in particular software (for example applications) or firmware FW). Furthermore, the control device SG1 comprises one or more storage media M (for example main memory or flash memory) for accenting application software, firmware FW or an operating system.

Nowadays, controllers or control devices SG1 are increasingly equipped with a local wireless service interface SS (for example WiFi, Bluetooth). The wireless service interface SS has to be manually activated by the technician for service purposes and switches off again automatically after a timeout so that the wireless service interface SS is permanently deactivated in normal operation (for example due to requirements of the building IT administration; as an IT security measure; or due to lower power consumption as a result of a switched off radio module the controller SG in normal operation).

To date, the wireless service interface SS has been activated via a local service button ST on the control device SG1 (controller). Poorly accessible installation sites for the control device SG1 in turn make the actuation of this service button ST to activate the wireless service interface SS by an operator B3, B4 laborious and time-consuming (for example dismantling panels, opening covers). Therefore, advantageously, the control device SG1 is configured to simulate the actuation of a service button ST located locally on the control device SG1 by the received signal SIG2 and thereby activate the wireless service interface SS. The wireless service interface SS is, for example, a radio interface (for example WiFi interface).

After activation of the wireless service interface SS, the control device SG1 is configured to receive data (for example firmware FW and/or application programs) and/or to send data via the wireless service interface SS. In the depiction according to FIG. 3, after activation of the wireless service interface SS, the control device SG1 is located in the WLAN network of an exemplary router R. After activation of the wireless service interface SS, a user B4 (for example commissioning engineer or service technician) can upload firmware FW or a firmware update to the control device SG1 via a tool T4 (for example mobile communication terminal, smartphone, tablet computer, PC). The WLAN network of the router R establishes the communication link KV between tool T4 (for example engineering tool or commissioning tool) and the control device SG1.

Uploading larger volumes of data to control devices with "a non-IP building network" (for example BACnet MSTP backbone) is generally very inefficient due to the low transmission capacity and would take far too long for commissioning (for example several hours for a firmware update). In some embodiments, the control device SG1 is configured such that the wireless service interface SS can be activated by specific commands of the backbone network KN2 triggered by the third tool T3.

In some embodiments, the control device SG1 is configured such that activation of the wireless service interface SS takes place by simulating an actuation of a service button ST located locally on the control device SG1. In some embodiments, the control device SG1 is configured such that the control device SG1 receives or sends data via the wireless service interface SS after activation of the wireless service interface SS. In some embodiments, the control device SG1 is configured to automatically deactivate the wireless service interface SS after the reception or transmission of the data FW. Data can, for example, be user data, parameters, configurations, application software, and/or firmware FW.

In some embodiments, the control device SG1 is configured to receive data (for example firmware, firmware update) from the third tool T3 or from a fourth tool T4 via the wireless service interface SS. The third tool T3 or fourth tool 14 can, for example, be mobile communication terminals, smartphones, tablet computers, or personal computers (PCs) equipped, for example, with corresponding software for an engineering tool and/or commissioning tool and/or configuration tool. The third tool T3 and fourth tool T4 can be physical different tools, operated, for example, by different users B3 or B4. However, the third tool T3 and fourth tool T4 can also be identical.

In some embodiments, in the event of non-use, the wireless service interface SS is automatically deactivated after a defined time period. In some embodiments, the wireless service interface SS of the control device SG1 can be deactivated via a signal SIG2' generated by the third tool T3 and sent to the control device SG1.

Figure 4:
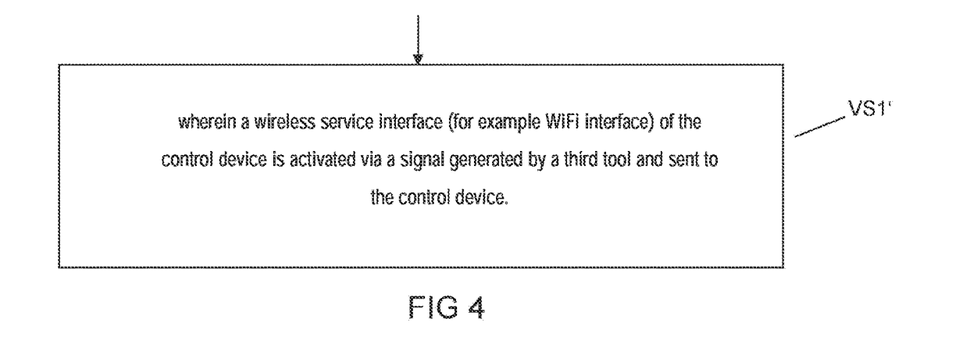
FIG. 4 a second exemplary flowchart for a method for transmitting data to a control device incorporating teachings of the present disclosure.

FIG. 4 shows a flowchart for a second exemplary method for transmitting data to a control device (controller) incorporating teachings of the present disclosure, in particular for building automation, control device (controller), wherein the control device is connected to one or more tools (for example engineering tool; PC) by a backbone network, in particular a non-IP network, (VS1') wherein a wireless service interface (for example WiFi interface) of the control device is activated via a signal generated by a third tool and sent to the control device.

In some embodiments, after activation of the wireless service interface, data is transferred to the control device from the third tool (engineering tool, commissioning tool) or from a fourth tool (engineering tool, commissioning tool) via the wireless service interface and/or data is read from the control device.

In some embodiments, a control device (for example controller, PLC, automation device) available on the backbone network (for example BACnet network) is selected by the third tool as the recipient of the data. A list of the control devices attached to the backbone network can, for example, be shown on a display of the control device. A user (for example service technician) can select a corresponding control device by means of corresponding selection or input mechanisms.

In some embodiments, the wireless service interface is activated by simulating an actuation of a service button located locally on the control device. In some embodiments, the wireless service interface is automatically deactivated when the data transfer has been completed. In some embodiments, in the event of non-use, the wireless service interface is automatically deactivated after a defined time period.

Exemplary Scenario for the Use of the Method According to the Exemplary Flowchart According to FIG. 4:

The wireless service interface of a controller (control device available on the backbone network (for example slow BACnet MS/TP backbone) is activated by a tool_A (for example PC, engineering system) via the backbone network.
    i. For this, a controller must be selected via tool_A from a list of controllers available on the backbone ii. The local wireless service interface the selected controller is manually switched on and off by corresponding tool commands from tool_A via specific commands via the backbone.

iii. The selected controller can be easily identified on tool_B by detecting the wireless network (for example as new WiFi SSID) and connected to tool_B.

iv. Optionally, tool_A can be reconnected to the controller via the activated wireless service interface.

Advantages of the Method According the Exemplary Flowchart According to FIG. 4 are in Particular:

After the connection of tool_B to the wireless service interface, larger volumes of data can be uploaded to the controller very easily and quickly.

The activated wireless service interface advantageously automatically switches off if is not used (after a timeout).

After a controller reboot, the wireless service interface is advantageously no longer switched on (for example reboot after successful FW download).

Tool_A is used to activate the wireless service in via a bus system.

Tool_B is used to upload data to the controller via the wireless service interface.

Tool_A and tool_B can be identical; they can be operated by different or identical users.

The methods described herein can usually be implemented with infrastructure that is usually already present in a building (for example WLAN routers). In some embodiments, there is an arrangement configured to perform the method.

Exemplary further Advantages of the Exemplary Embodiment According to FIG. 3 or FIG. 4:

The simple and unique remote activation of the local wireless service interface enables the service technician to identify (locate) the correct controller for the room very quickly, efficiently and reliably and directly start the fast download of the required data. The building backbone does not have to be operational for this.

There is no need for time-consuming localization of the controller in poorly accessible locations and the removal of false ceilings, window panels or false floors in order to attach a USB tool cable or to actuate the service button.

On-the-fly servicing is greatly simplified and expedited because the data can be uploaded at high speed via the wireless service interface.

Automatically switching off the wireless service interface by means of a timeout eliminates the need for manual deactivation by the service technician (which is often forgotten) when the servicing is completed Commissioning and servicing are performed much more quickly and reliably.

A method for transmitting data to a control device (for example controller, automation device), in particular for building automation, wherein the control device is connected to a tool (for example engineering tool; PC) by a communication network, wherein a wireless service interface (for example WiFi interface) is activated via a signal generated by the tool and sent to the control device in order to transmit (send and receive) data. The communication network can, for example, be a field bus (for example KNX bus) or a backbone network (in particular a non-IP network).

REFERENCE SYMBOLS

SG, SG1, SG2 Control device
ST Service button
SS Service interface
P Processor
M Memory
R Router
WLAN Wifeless network
KV Communication link
KN1, KN1', KN2 Communication network
FG1-FG5 Field device
PT1-PT3 Programming button
SP1-SP3 Service pin
SIG1, SIG2, SIG1', SIG2' Signal
T1-T4 Tool
B1-B4 User
FW Firmware
VS1, VS1' Method step

What is claimed is:

1. A control device for controlling one or more field devices connected to the control device by data technology in the form of a communication network, the control device comprising:
    a wireless service interface for commissioning or for updating firmware or for maintenance or for patching the one or more field devices;
    wherein the communication network comprises a fieldbus connecting the control device to one or more tools;
    the wireless service interface is activated by a trigger command received from a first tool via the communication network;
    the wireless service interface is activated by specific commands of the fieldbus triggered by the first tool;
    the control device transfers data via the wireless service interface after activation of the wireless service interface; and
    the wireless service interface is deactivated when the data transfer has been completed.

2. The control device as claimed in claim 1, activation of the wireless service interface includes simulating an actuation of a service button located on the control device.

3. The control device as claimed in claim 1, wherein the control device is configured to receive the data from the first tool or from a second tool via the wireless service interface.

4. The control device as claimed claim 1, wherein the wireless service interface is deactivated by the first tool via the communication network.

5. A method for transmitting data to a control device connected to one or more tools by a communication network including a fieldbus, the method comprising:
    receiving a signal from a firs tool of the one or more tools through the fieldbus;
    in response to the signal, activating a wireless service interface of the control device based on specific commands of the fieldbus triggered by the;
    transferring data with the control device via the wireless service interface after activation of the wireless service interface; and
    deactivating the wireless service interface when the data transfer has been completed.

6. The method as claimed in claim 5, further comprising, after activation of the wireless service interface;
    transferring data from the first tool or from a second tool to the control device via the wireless service interface; or
    reading data from the control device.

7. The method as claimed in claim 5, wherein the activation of the wireless service interface includes simulating the actuation of a service button located on the control device.

8. The method as claimed in claim 5, further comprising automatically deactivating the wireless service interface when the data transfer has been completed.

9. The method as claimed in claim 5, further comprising deactivating the wireless service interface via a further signal generated by a first tool and sent to the control device.

10. A control device controlling one or more field devices, the control device comprising:
    a connection to one or more tools through a backbone network using wireless service interface;
    wherein the backbone network comprises a non-IP networked based on a BACnet protocol;
    wherein the wireless service interface is activated by one of the one or more tools via the backbone network;
    wherein the control device transfers data via the wireless service interface after the wireless service interface has been activated; and
    wherein the wireless service interface is deactivated after the data transfer is complete.

11. The control device claimed in claim 10, wherein the wireless service interface is activated by specific commands of the backbone network triggered by the third tool.

12. The control device as claimed in claim 10, wherein activation of the wireless service interface includes simulating actuation of a service button located on the control device.

13. The control device claimed in claim 10, wherein after activation of the wireless service interface, the control device receives or sends data via the wireless service interface.

14. The control device claimed in claim 10, wherein the wireless service interface is deactivated by the third tool via the communication network.

15. A method for transmitting data to a control device connected to one or more tools by a backbone network, the method comprising:
    receiving a signal from a first tool of the one or more tools through the backbone network;
    in response to the signal, activating a wireless service interface of the control device to provide communication with at least one separate tool without using the backbone network;
    transferring data between the control device and the at least one separate tool through the wireless service interface after activation of the wireless service interface; and
    deactivating the wireless service interface after the data transfer is complete;
    wherein the backbone network comprises a non-IP network based on a BACnet protocol.

16. The method as claimed in claim 15, further comprising, after activation of the wireless service interface:
    transferring data from the third tool or from a fourth tool to the control device via the wireless service interface; or
    reading data from the control device.

17. The method as claimed in claim 15, further comprising using the third tool to select a control device available on the backbone network as recipient of the data.

18. The method as claimed in claim 15, further comprising deactivating the wireless service interface via a further signal generated by the third tool and sent to the control device.

* * * * *